Oct. 14, 1969  S. V. BAXTER  3,471,897
ROLL EMBOSSING MACHINE FOR PLASTIC NEEDLED CARPET
Filed Sept. 21, 1967  2 Sheets-Sheet 1

INVENTOR.
STANLEY V. BAXTER
By Beehler & Arant
ATTORNEYS.

Oct. 14, 1969    S. V. BAXTER    3,471,897
ROLL EMBOSSING MACHINE FOR PLASTIC NEEDLED CARPET
Filed Sept. 21, 1967    2 Sheets-Sheet 2
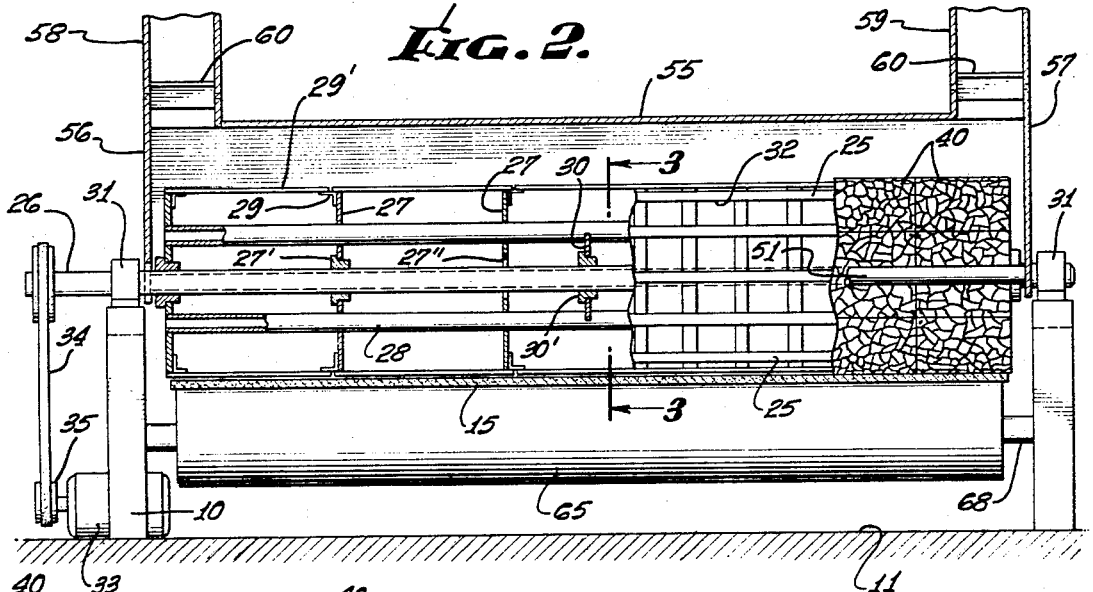
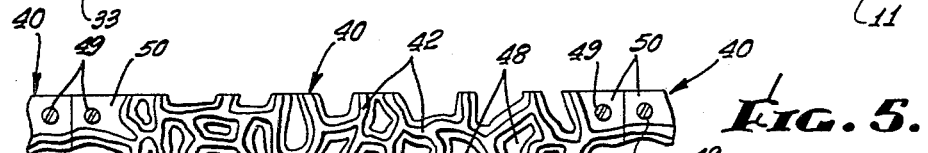
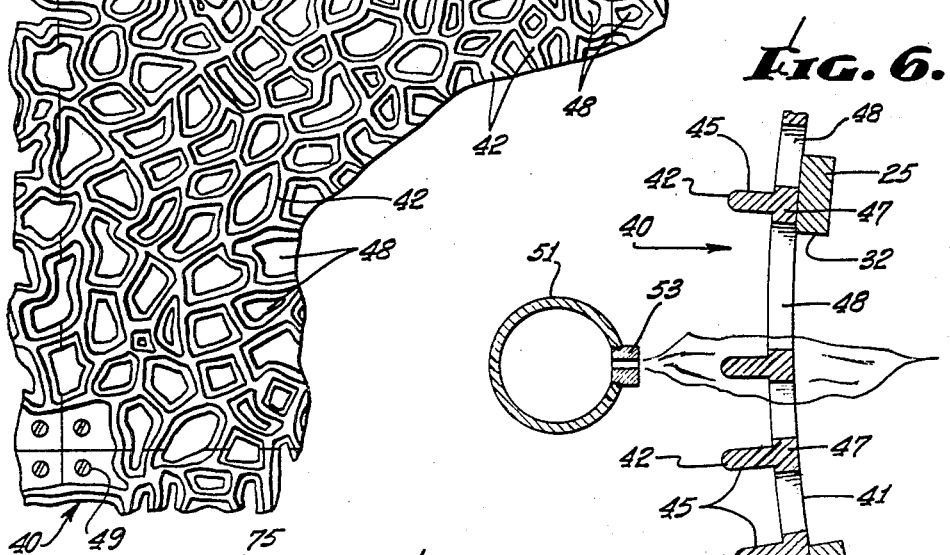
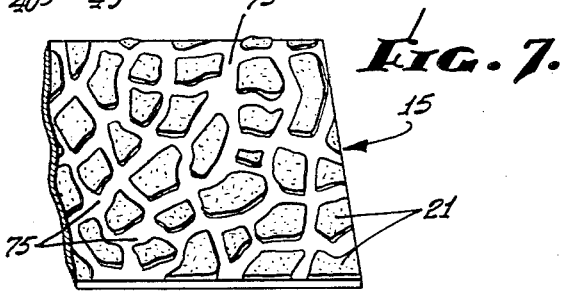
INVENTOR.
STANLEY V. BAXTER
By Beehler & Grant
ATTORNEYS.

United States Patent Office 3,471,897
Patented Oct. 14, 1969

3,471,897
ROLL EMBOSSING MACHINE FOR PLASTIC NEEDLED CARPET
Stanley V. Baxter, Downey, Calif., assignor to Orcco Industries, Inc., Los Angeles, Calif., a corporation of California
Continuation-in-part of applications Ser. No. 527,273, Feb. 14, 1966, and Ser. No. 565,612, July 15, 1966.
This application Sept. 21, 1967, Ser. No. 669,560
Int. Cl. B29d 7/14
U.S. Cl. 18—10                                              7 Claims

ABSTRACT OF THE DISCLOSURE

The needled thermoplastic carpet embossing apparatus features an embossing roll with heated embossing edges in cooperation with a back-up roll between which carpet is fed in such a way that the edges thermally emboss a pattern in the carpet fibers. Ventilation openings are provided in the embossing roll for conducting heat from carpet regions between the embossing edges through the interior of the roll to atmosphere, to prevent overheating and damaging the carpet in these regions.

---

This is a continuation-in-part of copending applications Ser. No. 527,273, filed Feb. 14, 1966, and Ser. No. 565,612, filed July 15, 1966, now abandoned.

The invention relates to the creation of a permanently embossed pattern on a pile carpet and in particular a needled carpet the fibers of which are thermoplastic and therefore adapted to accept a permanent deformation. The invention more properly is concerned with an appropriate apparatus for creating the embossed pattern.

Although needled felt carpets and rug pads have long been in use, needling of thermoplastic fibers to form a floor covering is a more recent development. As in the case of former needling techniques the fibers are needled to a fabric scrim and the thickness of the resulting product built up to a desired amount by the quantity of fibers applied and the amount of needling employed. In either case, the needling operation leaves the surface of the floor covering with a fiberlike appearance which is agreeable to the eye and to the touch. When thermoplastic fiber materials are employed, they have appreciable advantages in that they are impervious to water, are wear resistant, colorfast, readily washable, and resistant to stretching and warping. As a consequence, such needled fabrics are popular for outdoor use whether on stationary floor surfaces such as decks and swimming pool areas or on the decks of boats or other vehicles where there is considerable exposure to weather and sun.

In the ordinary course of creating a needled fabric of this kind the fibers stand both below and above the scrim. Usually on the underside the fibers are matted and held in place by an appropriate sizing compound. On the opposite side, where the fibers are exposed, they may be trimmed to present a neat appearance or left somewhat rough depending upon taste. In any event, the exposed fibers present a texture which is attractive but which, on the other hand, is substantially uniform in color and without a pattern effect. In some instances needled carpets are made without use of scrim.

While it is true that some needled fabrics have had waffle or grid-like patterns ironed into them, such ironing in of patterns where fabrics in the past have been available have not been permanent and the machinery and methods useful in creating a waffled or the like pattern on ordinary felt have not been found adaptable to needled thermoplastic fibers.

Conventional embossing techniques have experienced little change in the past several decades in the employment of engraved embossing rolls as exemplified by Schmidt Patent 1,241,152. Solid rolls having shallow embossing edges capable of being heated in their entirety have been needed for ironing in an embossed pattern on pile carpet under substantial pressure. Such rolls need support midway between the ends to prevent bowing. None are ventilated and virtually all are heated interiorly, either by gas or steam. Suction rolls used in the fabrication of pulp paper materials as exemplified by Bryand Patent 3,139,375 are suited only to a soft wet paper web and are designed to operate cold. Still others with rolls heated both outside and inside as exemplified by Knowland et al. Patent 3,032,811 are for changing the surface character of the material completely by curing the web clear through from face to face.

Although the embossing of thermoplastic needled felt floor coverings has been made broadly the subject matter of applicant's patent application, the chain operated embossing belt has been found not suited to certain particular types of production. A desired attribute of embossed needled fabric of the kind here under consideration is to provide a line of demarcation which comprises the embossing of a depth and definition such that clear-cut lines of demarcation may be avoided, when desired, and also so as to avoid sharp or ragged edges at the margins of the embossed portions. Sharp or ragged edges is the common result where there is lack of control of the heating and softening of thermoplastic fibers such as those here under consideration.

Material considerations in the embossing of the thermoplastic needled fiber floor covering are the temperature of the embossing irons, the dwell time of the irons on the fabric, and the speed of movement of the fabric past the embossing irons as well as properly ventilating the space between the embossing irons so as not to fuse the fibers on other portions of the fabric where embossing is to be avoided. The depth of embossing must also be taken into consideration and, moreover, apparatus need be considered which can be varied so that by a change in set-up the same basic rolls can be used for a different pattern effect, and the embossing irons and arcuate plates which contain them need be so arranged that they can accommodate an over-all pattern, edges of which can be matched between one strip and another when the fabric is layed upon a floor surface. Irrespective of the depth of the embossing, the soft original appearance of the pile in the areas intermediate the embossing lines must be carefully preserved.

Among the objects of the invention therefore is to provide a new and improved embossing technique for the application of an embossed pattern upon thermoplastic needled felt carpet which makes use of a roll for carrying the embossing iron.

Another object of the invention is to provide a new and improved embossing technique for needled thermoplastic felt fabric material which is relatively rapid in its operation, wherein the heating can be carefully and accurately controlled and which is of such construction as to improve the speed of travel of the needled felt carpet in a way productive of the most desirable results.

Still another object of the invention is to provide a new and improved apparatus for creating an embossed pattern upon needled thermoplastic fabric carpet which though capable of being used for material of relatively great breadth can nevertheless be dismantled, and embossing irons removed and replaced by others, with a minimum of shut-down time.

Still another object of the invention is to provide a new and improved apparatus for the embossing of thermoplastic needled felt carpet material which is capable of creating a relatively soft agreeable embossing line between areas of the carpet material without danger of disturbing the soft unmarred effect of the areas between embossed lines.

With these and other objects in view, the invention consists in the construction, arrangement, and combinaation of the various parts of the device, whereby the objects contemplated are attained, as hereinafter set forth, pointed out in the appended claims and illustrated in the accompanying drawings.

In the drawings:

FIGURE 2 is a longitudinal sectional view on the line 2—2 of FIGURE 1.

FIGURE 5 is a fragmentary plan view of exterior segments of the embossing roll.

FIGURE 6 is a fragmentary cross-sectional view showing the apparatus at the point of application of heat to the embossing roll.

FIGURE 7 is a fragmentary top perspective view of one form of embossed carpet created by employment of the apparatus.

Figure 1:
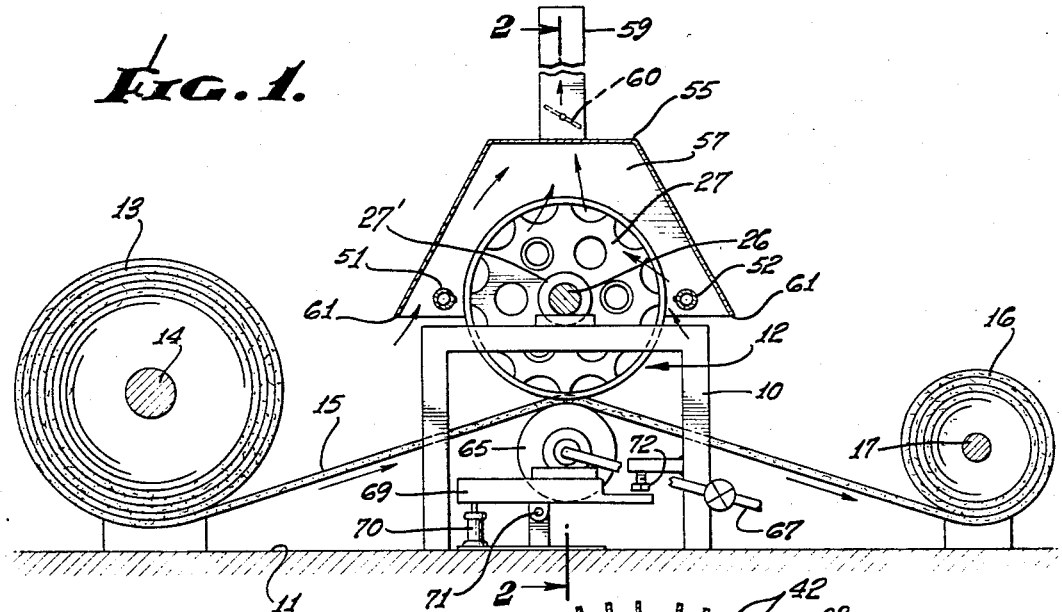
FIGURE 1 is a schematic side elevational view of the apparatus showing carpet from a feed reel passing through the apparatus to a take-up reel.

In an embodiment of the invention which has been chosen for the purpose of illustrating the principles involved in applicant's invention, there is shown a frame 10 on a supporting surface 11, the frame being for the purpose of supporting an embossing apparatus indicated generally by the reference character 12. A feed reel 13 carried rotatably upon a feed reel shaft 14, is also mounted on the supporting surface 11 and supplies a strip of needled fiber carpet 15 to the embossing apparatus 12 from which the carpet travels to a take-up reel 16, which in turn is carried by a take-up reel shaft 17 likewise mounted upon the supporting surface 11.

Figure 4:
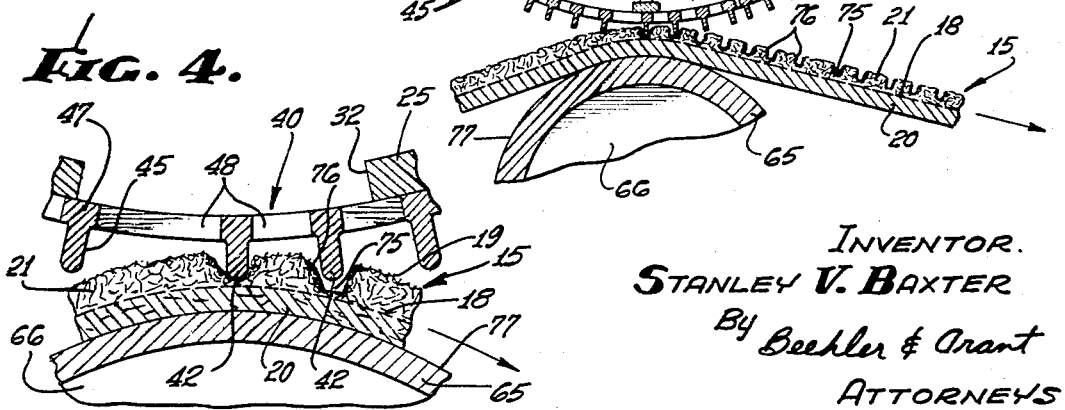
FIGURE 4 is a fragmentary cross-sectional view of the machine at the area of embossment.

In the interest of understanding the embossing apparatus attention is directed to the character of the needled fiber carpet 15 shown in cross-section in FIGURE 4. A layer of scrim 18 forms a carrier for the fibers. These are tangled fiber strands 19 and, what is significant, is that the strands are preferably monofilament strands of synthetic thermoplastic resin material of which polypropylene is a typical example. Following conventional practice, the strands 19 are needled into engagement with the scrim 18 so that there is a mass of substantially felted fiber strands on both sides of the scrim. On the underside the strands are impregnated with an appropriate sizing material which results in a matted layer 20. On the opposite sides the strands are in the form of a pile felted layer 21, devoid of sizing, and this forms the soft textured surface of the carpet. On those occasions where no scrim is employed sizing is used to only partially penetrate the thickness.

It is further significant to the apparatus and its operation as herein described that synthetic thermosetting plastic fibers have a softening point which varies to some extent depending upon the nature of the thermosetting material involved. For material exemplified by nylon, polyester, polypropylene, acrylic and rayon fibers the softening temperature will range from about 475° F. for the former down to about 250° F. for the latter. Each material in turn has its critical softening point and a critical melting point very slightly higher than the softening point.

To emboss the felted layer 21 with a permanent embossing line requires softening of the fibers along the line of embossing to a point approximately the melting point. This will cause the fibers to take a permanent set at the embossing line. Extreme care must be taken, however, to avoid softening the felted layer throughout areas intermediate the line of embossing inasmuch as this would detract prohibitively from the appearance of the carpet surface. Also to provide an attractive smooth appearance, the embossed line should not be too sharp and the softening and melting of the fibers along the line of demarcation between the felted layer surface and the embossed depression should be kept smooth, gently depressed, and should avoid the creation of loose, hardened or beaded fiber ends at the edge of the depression. Inasmuch as fibers of the type here under consideration become quite hard and sharp when subjected to uncontrolled melting or fusing, it is important that when this characteristic is taken advantage of, the operation must be kept under careful control.

The embossing apparatus 12 consists of a drum 25 which may be of composite construction or of boiler plate sheet steel, cylindrical in form, and as much as 150 or more inches long, depending upon the breadth of the carpet which is being handled. The drum 25 is mounted upon a shaft 26, preferably by employment of open discs or similar supports 27, several of which are located intermediate the ends, so that intermediate portions as well as both ends of the drum provide free circulation of air. Open end stiffening tubes 28 extend through all of the supports 27, from end to end of the drum and are additionally supported by a central gusset plate 30 midway between opposite ends of the drum. The gusset plate 30 is secured to the shaft 26 by a bushing 30'. The shaft 26 in turn is supported upon appropriate bushings 31 carried by the frame 10. In the surface of the drum 25 are large openings 32 so that the drum is of very open construction throughout its entire circumference. Some of the supports 27 have bushings 27' mounting them on the shaft 26. Others have openings 27" to clear the shaft 26 and are welded to the stiffening tubes 28. Angles sections 29 on the discs support circumferential straps 29'. A motor 33 having a drive belt 34 acts through a driven pulley 35 to drive the shaft 26. The tubes 28 extend outwardly beyond the heated portion of the drum 25.

In the chosen embodiment the drum 25 takes on the character of an embossing roll when arcuate embossing plates like the plates 40 are attached to its exterior circumference. These embossing plates 40, shown in some detail in FIGURES 5 and 6, have a curved inside surface 41 which corresponds to the curvature of the exterior of the drum 25. The aggregate of outside surfaces 42 form the exterior surface of the composite embossing roll. One embodiment of the invention contemplates embossing plates 40 of 18 inches in length which aggregates 144 inches for eight such sections, thereby to provide for a margin of 3 inches at each end of the roll. For a drum 25 which is 108 inches around the outside circumference of the plates when mounted thereon, 6 embossing plates 40 may be provided having an arcuate length of 18 inches each at the inside circumference, the inside dimension of the arcuate plates being in multiples of the exterior circumference of the drum.

Each embossing plate 40 is complete in itself, and for the selected pattern of the embodiment of the invention herein illustrated, the embossing means on the plates consists of a series of relatively flat elements 45 which trace the configuration of the embossed pattern as shown to good advantage in FIGURES 6 and 7. The flat elements have relatively free outer edges already indicated as outside surfaces 42 which are the edges which actually engage the carpet 15 and produce the embossed line. Inside portions of the flat elements 45, namely the portions 47, may be wider as shown in FIGURES 4 and 6 in order to form a better means of attachment to the drum 25. Abundant open areas 48 are provided between the inside portions 47 and these communicate directly with the openings 32 in the drum 25. Bolts 49 extending through certain of the inside portions 50 may be threaded into the material of the drum 25 in order to fasten the embossing plates 40 in the appropriate position.

Figure 3:
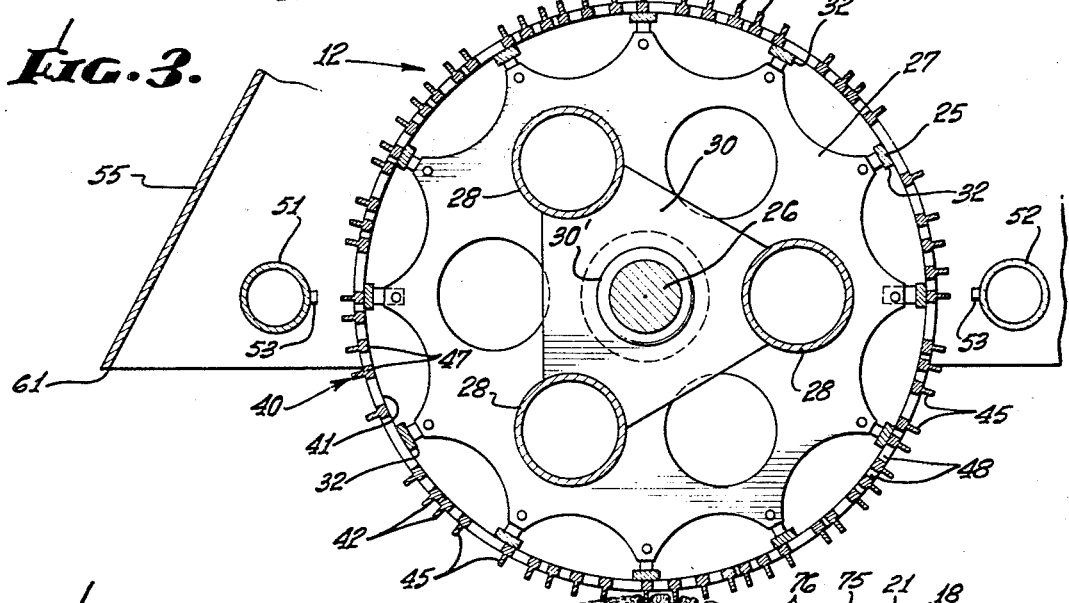
FIGURE 3 is a cross-sectional view of the embossing roll and back-up roll on the line 3—3 of FIGURE 2.

In order to heat the outside edges 42 of the flat elements 45, heat in some form must be applied to them when they are in position forming part of the embossing roll as shown in FIGURES 1, 3 and 6. One form of heater, as shown in FIGURES 1 and 6, has the form of mixed air and gas pipes 51 and 52 extending throughout the length of the embossing roll. The pipe 51, located on the approach side of the embossing roll is spaced about one quarter of the roll circumference from the embossing area to make certain that the outside edges 42 which are the embossing surfaces, are at a proper embossing temperature when they are moved into engagement with the fiber carpet 15, inasmuch as some heat will be lost during travel from the heating point. Jets 53 are spaced throughout the length of the pipe to uniformly heat the embossing surfaces 42 from end to end of the roll. The pipe 52 serves to supply gas and air mixture for heating the roll on the opposite side so that it will not become too cool before being reheated by the jets 53 of pipe 51.

A ventilating hood 55 extends over the entire length of the roll and has end walls 56 and 57 spaced from the ends of the roll. Vent stacks 58 and 59 at opposite ends serve to induce a flow of air upwardly in the stacks. Regulating dampers 60 may be provided. Lower edges 61 of the hood flare out generously so that an abundance of ambient air may be introduced under the hood and particularly into the open areas 48 between the flat elements 45.

Air passing through the open areas 48 flows freely through the substantially coincident openings 32 to make certain that the temperature of air present in the areas intermediate the flat elements 45 does not rise to a level which will soften the fibers in the spaces intermediate the embossed line of the pattern. The flow of air is also helpful in keeping the temperature of the inside portions 47 at a desirable level, for the same precautionary purpose. The embossing temperature can in this way be carefully controlled. A sufficient draft is created by the differences in temperature caused by the heating operation to avoid need for forced circulation of cooling air.

Since parts of the embossing plates intermediate the flat elements are of very open construction, there will be no undue heating of the inside portions 47 nor of the drum 25. It will, of course, be appreciated that other heaters may be employed such, for example, as infrared heaters, or other appropriate types of conduction or radiation heaters which are adequate for the purpose.

In order to create the necessary embossing imprint, there is provided a back-up roll 65 having a chamber 66 therein adapted to be supplied with cooling fluid from a fluid supply line 67. A tubular shaft 68 may be provided for mounting the back-up roll 65 on an appropriate adjusting table 69 in parallel alignment with the drum 25. Pressure rams 70 carried upon the supporting surface 11 may be employed to raise or lower the back-up roll as occasion may require, tilting the roll about a fulcrum point 71. An adjustable stop screw 72 on the frame 10 limits movement of the table to a selected position, thereby to prevent squeezing the carpet 15 between the rolls to a greater extent than desired.

In operation the embossing roll is rotated by appropriate means, as described. As the carpet 15 travels through a location comprising an embossing area between the bite of the embossing roll with the back-up roll 65, a grip of the embossing roll on the carpet will serve to advance the carpet and, at the same time, impress an embossed line creating the pattern. The outer edges 42 during this phase of the operation contact the fibers of the felted layer 21 at only the areas of pressure of the outer edges. When these are heated to slightly above the softening point of the fiber strands 19, those fibers actually engaged by the outer edges of the flat elements are softened and melted to a degree, and in this softened, almost melted condition are pushed to a location adjacent the scrim 18. While an embossing trench 75 thus created may vary in depth, shallower embossing trenches are found desirable in that they do not generate a look which is too harsh on the finished pattern surface. It is also advisable to have the pressure of the outer edges applied somewhat gradually, not too sharply, and at a temperature which does not immediately melt or fuse the strands 19. It is quite significant that soft rounded edges 76 be provided at opposite sides of the embossing trenches 75 so that the trenches will be somewhat rounded and so that there will not be sharp, hard, ragged fused ends of fibers at the edges of the trenches. As a guide the depth of the trenches should be kept such that they clear the scrim 18, on those occasions where scrim is employed, thereby to leave a layer of fused or partially fused strands on the upper side of the scrim. If no scrim is present, the trench is merely pressed into the fibers to a comparable depth.

In order to establish the depth of the embossing trenches a desired spacing is established between the outer edges 42 of the flat elements 45 and the circumference 77 of the back-up roll 65. This adjustment is made by proper manipulation of the adjusting jacks 70. When this spacing has been established, and the embossing roll is rolled against the carpet 15, the outer edges will penetrate to the established depth and no deeper. Further still, more than temperature alone needs to be taken into consideration in that the dwell time of the outer edges 42 on the carpet has an appreciable effect upon the character of the embossing trench which is created. If the temperature of the outer edges is relatively hot, the dwell time will be short. On other occasions, if the temperature of the outer edges is lower, the apparatus will be run at a slightly lower speed, thereby allowing sufficient heat to build up in order to soften and to a degree melt the fibers of the carpet. In addition to appearance the fused fibers at the bottoms of the embossing trench form an interconnected trench system cover the area of the pattern thereby to greatly inhibit stretching of the carpet both during shipment and after having been laid.

Of greater significance is the avoidance of softening the fiber strands 19 in the areas intermediate the embossing trenches 75. This is accomplished by preventing the building up of heat in corresponding areas of the embossing plates 40. Objectionable heating is achieved by thoroughly venting those areas through the embossing plates and also through the material which comprises the drum 25.

Since the embossing plates 40 are shown in multiples of dimensions of the drum, they can be removed and replaced by other plates having different embossing patterns on them. Further still, since the depth of the flat elements 45 needs to be appreciable to establish a desired depth for the trenches 75 and at the same time avoid softening fibers in the intermediate spaces, cast embossing plates allow for providing such a depth. To secure a comparable depth in a solid engraved roll would be prohibitively expensive. Also by keeping the embossing plates in fixed multiples of the dimensions of the drum 25, when reels of embossed carpet are created by the operation, edges of carpet from different reels can be matched on the floor in either direction so as to preserve the overall pattern effect desired when the edges are joined on the floor.

Also in order to produce a desired depth and hardness of embossing trench, cooling of the back-up roll 65 can be varied to suit the process by a change in the volume or temperature of fluid which flows from the fluid supply line 67 into the back-up roll. The temperature may also be varied on the outer edges 42 of the flat elements of the embossing plates so that there is a balance, coupled with the speed of operation of the apparatus, which gives a soft desired appearance to the embossing trench and which can be adjusted also to vary the depth.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. An apparatus for the roll embossing of a needled carpet of thermoplastic fiber material comprising a frame, a substantially cylindrical embossing roll having an axial shaft rotatably mounted on said frame and a back-up roll rotatably mounted on said frame in parallel relationship with said embossing roll and with the circumference of said back-up roll in pressure relationship with said embossing roll forming with said embossing roll an area of embossment, said embossing roll having an interior chamber vented to atmosphere and a substantially perforate circumference, a pattern making embossing means on the exterior circumference of the roll comprising a series of radially extending substantially flat elements having inwardly extending portions adjacent the chamber and free outwardly extending embossing edges lying in a substantially cylindrical plane, said flat elements being interconnected with a metal-to-metal contact throughout said exterior circumference and forming air spaces adapted to overlie areas of carpet which are not to be embossed, heating means for heating said embossing edges prior to contact with the carpet at said area of embodiment, the temperature at the embossing edges at said area of embossment being at least as high as a temperature at which said fiber material softens, the temperature in said chamber being lower than the temperature at the surface of said embossing roll at the area of embossment whereby to promote flow of hot air from said air spaces toward said chamber, said back-up roll being relatively cooler and exposed to ambient air, said air spaces intermediate said embossing edges being in communication between said chamber and an area of the needled carpet encompassed by said embossing edges when said embossing edges are within said area of embossment, the temeprature of said air spaces being lower than the temperature at which said fiber material softens, feed and take-up reels for said carpet at respectively opposite sides of the embossing roll and means for passing said carpet from said feed reel past said embossing roll and presure roll to said take-up reel.

2. An apparatus as in claim 1 wherein there is a ventilating hood extending over the entire length and breadth of the embossing roll and having an open bottom for admission of air extending over sides and ends of said embossing roll, said hood including a stack for the outflow of air from said hood.

3. An apparatus as in claim 1 wherein said heating means is at a location exterior with respect to the chamber, said heating means being productive of a temperature in the embossing means at said area of embossment during operation higher at the embossing edges than at portions thereof located radially inwardly from said embossing edges.

4. An apparatus according to claim 1 wherein said cylindrical embossing roll comprises a relatively stiff self-supporting hollow, cylindrical drum and arcuate plates having a removable attachment to said drum, each said plate comprising substantially radially extending flat elements having outwardly facing edges, said edges tracing an embossing pattern, said flat elements forming said air spaces therebetween, said cylindrical drum having openings therein substantially coincident with said air spaces.

5. An apparatus as in claim 1 wherein there are a plurality of circumferentially spaced stiffening tubes extending throughout the length of said embossing roll and spaced radially intermediate outer and inner portions of said embossing roll, and a plurality of axially spaced members interconnecting said axial shaft, said stiffening tubes and exterior portions of said embossing roll whereby to avoid bending of said embossing roll intermediate its ends during operation.

6. An apparatus according to claim 1 wherein the circumference of the back-up roll is spaced from the surface of the embossing edges by a distance substantially equal to the difference between the thickness of the carpet and the depth of an embossment to be impressed in said carpet, whereby the depth of the embossment is determined by the spacing of said rolls.

7. An apparatus according to claim 1 wherein said back-up roll has a chamber therein and a supply line leading into said chamber for cooling fluid.

References Cited

UNITED STATES PATENTS

| 2,803,040 | 8/1957 | Robert et al. | 18—10 |
| 3,027,595 | 4/1962 | Takoi et al. | 18—10 XR |
| 3,071,812 | 1/1963 | Miller. | |
| 3,313,002 | 4/1967 | Wyeth | 18—10 |
| 3,399,425 | 9/1968 | Lemelson | 18—10 |
| 3,414,048 | 12/1968 | Roll | 18—10 XR |

WILLIAM J. STEPHENSON, Primary Examiner